United States Patent [19]

Usami

[11] Patent Number: 5,624,085
[45] Date of Patent: Apr. 29, 1997

[54] TAPE MEASURE

[75] Inventor: Tsutomu Usami, Kyoto, Japan

[73] Assignee: Kyoto Measuring Instruments Corp., Kyoto, Japan

[21] Appl. No.: 425,527

[22] Filed: Apr. 20, 1995

[30] Foreign Application Priority Data

Jun. 15, 1994 [JP] Japan .................................. 6-132741
Jun. 15, 1994 [JP] Japan .................................. 6-132742

[51] Int. Cl.$^6$ .............................. B65H 75/48; G01B 3/10
[52] U.S. Cl. .................................. 242/381; 33/767
[58] Field of Search ..................... 242/381, 381.5, 242/396.6; 33/767, 769

[56] References Cited

U.S. PATENT DOCUMENTS

| 703,709 | 7/1902 | Olmstead | 242/381 |
|---|---|---|---|
| 3,318,550 | 5/1967 | Quenot . | |
| 4,687,155 | 8/1987 | Burton | 242/381 |
| 4,907,348 | 3/1990 | Hubbard . | |

FOREIGN PATENT DOCUMENTS

| 727712 | 6/1932 | France . |
|---|---|---|
| 58-15721 | 3/1983 | Japan . |
| 2170779 | 8/1986 | United Kingdom . |

OTHER PUBLICATIONS

Patent Abstracts of Japan, vol. 012, No. 081 (M–676), 15 Mar. 1988 & JP–A–62 222978 (NHK Spring Co. Ltd.), 30 Sep. 1987.

Primary Examiner—John M. Jillions
Attorney, Agent, or Firm—Jordan and Hamburg

[57] ABSTRACT

The present invention is directed to provide a tape measure which is capable of applying a frictional braking force to a winding reel by using a simple mechanism that may produce a larger friction force acting on the reel when winding a measuring strip downward into the housing. A housing accommodates a winding reel having a bearing rotatably supported by a supporting shaft. The winding reel contains a driving spring. The supporting shaft has a sectional form represented by a combination of two arcs, one of which has a large radius and the other has a small radius. In case of drawing a substantially horizontal measuring strip into the housing with the bearing being supported by large diameter portion of the supporting shaft, the winding reel whose bearing is loosely fitted on the supporting shaft may dance in the housing at an increased speed of its rotation and, at the same time, may contact at its projecting circumferences and side surfaces with the inside wall of the housing. The rotation speed of the winding reel can be reduced by the friction. In case of drawing the measuring strip into the housing placed with its port upward, the winding reel is supported at its bearing by the small diameter portion of the supporting shaft (1a) and rotates, keeping contact of its projecting circumference with the guide portion of the housing, being subjected to a large friction force.

17 Claims, 14 Drawing Sheets

TAPE MEASURE

BACKGROUND OF THE INVENTION

The present invention relates to a tape measure which is capable of winding a measuring strip on a spring-driven reel in a housing.

Measuring strips made of steel, cloth, plastics or other material have been used for measurement of a length and a distance. Any conventional measuring strip is wound manually or automatically into a housing. A measuring strip of a self-winding tape measure has a concave sectional form and has the property of straightening itself when it is drawn out of the housing. A winding reel with a spring drive is used as a winding mechanism of the self-winding tape measure. Automatic winding of the measuring strip is performed by reversing the reel in the housing by the action of the spring whose force for returning to its original shape is stored while the measuring strip is drawn out of the housing.

The thus constructed winding mechanism of the self-winding tape measure uses a strong spring that can completely wind a measuring strip on the winding reel overcoming a friction force, and can also reserve a returning force to a certain extent. When the measuring strip is drawn by 3 meters out of the housing and then rewound, it may be very fast rewound by the strong spring force and be rebound, causing a danger of damaging the strip itself and user's body.

Japanese Publication No. 58-15721 discloses a measure tape instrument wherein a winding reel is provided with a plate-weight that can enter into frictional engagement with a cylindrical surface of a brake drum by the action of a centrifugal force to prevent the winding reel from rotating at a speed over a certain dangerous limit.

The above-mentioned countermeasure is effective but causes an increase in the number of parts and requires an additional assembling work. There is also such a problem that, in case of rewinding a measuring strip upward stretching from the housing, the weight of the strip may be added to a winding force and, therefore, a larger braking force is required, i.e., additional countermeasure is still needed.

An attempt was made to provide a guide portion that may have frictional contact with the circumference of a conventional type winding reel, but it resulted in that the reel was considerably loaded through the constant friction with the guide portion and could not smoothly wind a measuring strip thereon. Such a problem also arose that the winding reel was seized by the guiding portion with a dirt inclusion therebetween.

SUMMARY OF THE INVENTION

It is an object of the present invention to provide a tape measure which has a self-winding mechanism that has a simple construction requiring no additional part and can prevent acceleration of rotation of its winding reel by frictional braking which can vary depending upon a direction of its housing.

It is another object of the present invention to provide a tape measure which is capable of setting a winding condition depending upon a direction of a housing because a supporting shaft is fitted with a play in a larger bearing bore of a winding reel.

It is another object of the present invention to provide a tape measure which, for instance, in drawing a measuring strip downward into the housing, is capable of obtaining a braking moment larger than that obtained when winding the measuring strip from any different direction.

It is another object of the present invention to provide a tape measure which has a supporting mechanism causing the winding reel to dance at an increased rotation speed, reducing its rotation speed by friction.

It is another object of the present invention to provide a tape measure wheel which has a winding reel with a bearing fitted with a clearance on a supporting shaft and has the housing with a formed therein guide portion with which projecting circumferences of the winding reel can contact when the winding reel is eccentrically supported by the supporting shaft. This allows the winding reel to rotate at a safe speed by the effect of a friction force produced.

DESCRIPTION OF THE PREFERRED EMBODIMENT

Figure 1:
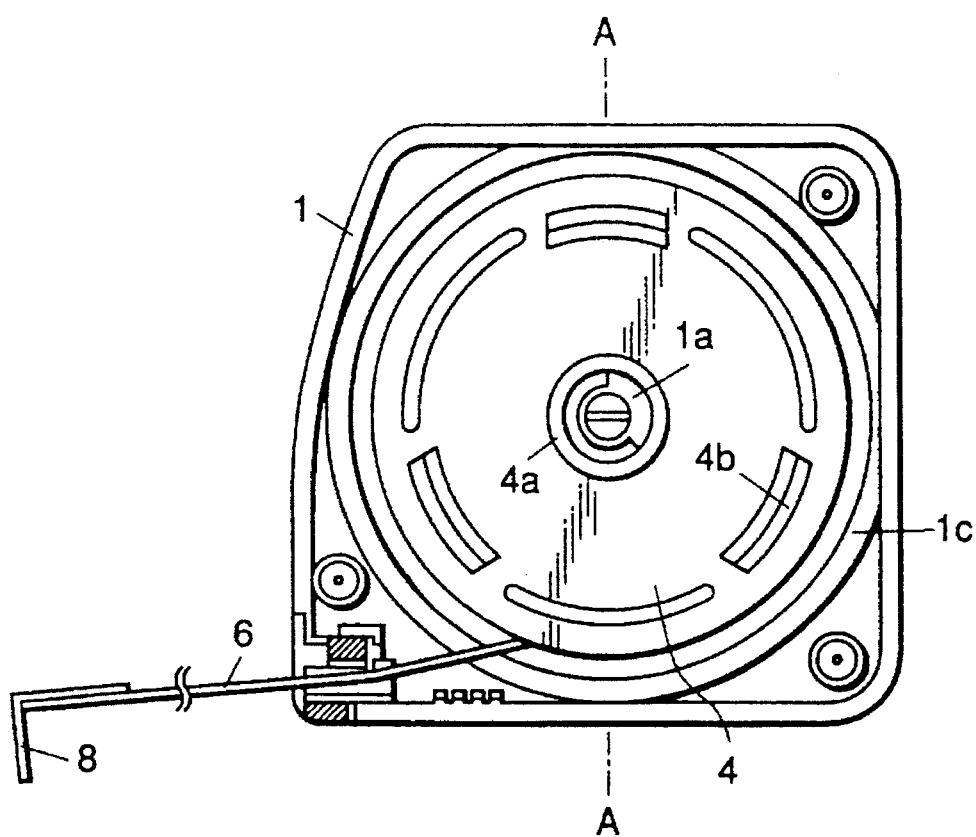
FIG. 1 is a plan view of a first embodiment of a measure tape, with an upper half of its housing removed for the shake of explanation, according to the present invention.
Figure 2:
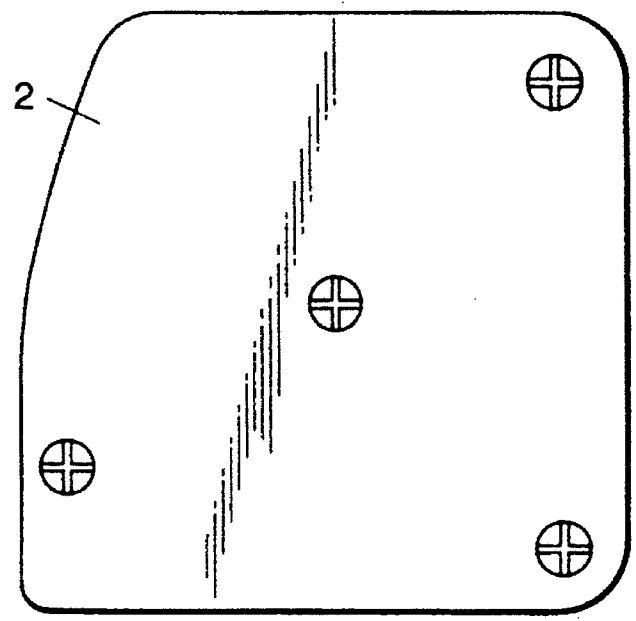
FIG. 2 is a plan view of the upper half of the housing of FIG. 1.
Figure 3:
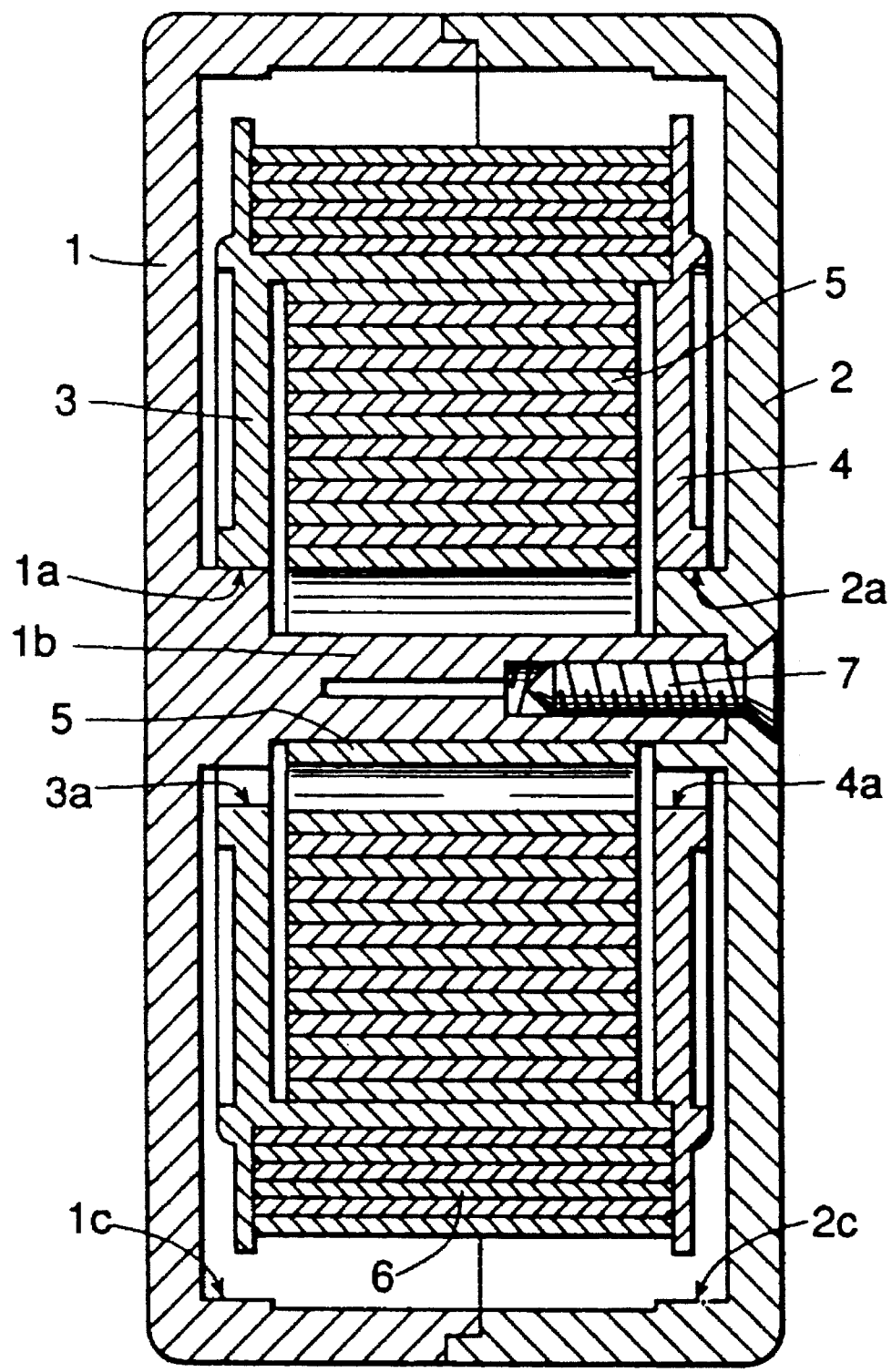
FIG. 3 is a sectional view taken along line A—A of FIG. 1.

FIGS. 1 to 3 are views for explaining a first embodiment of a tape measure according to the present invention: FIG. 1 is a plan view of the tape measure with a removed upper half of its housing, FIG. 2 shows the removed upper half of the housing and FIG. 3 is a view taken on line A—A of FIG.

1. In FIGS. 1 to 3, numeral 1 designates a lower half of a housing, 2 an upper half of the housing, 1a, 2a supporting shafts, 1b a mounting shaft, 1c, 2c guide portions, 3 a winding reel body, 4 a winding reel cover, 3a, 4a bearings, 4b a lug, 5 a driving spring, 6 a measuring strip, 7 a fixing screw and 8 an end hook.

The housing consists of the lower half 1 and the upper half 2. Two halves are fitted-on each other at their stepped peripheral edges. The lower half 1 of the housing is provided at its center portion with the mounting shaft 1b whose base is formed integrally with the supporting shaft 1a. The upper half 2 of the housing has, in its center portion, a hole for the fixing screw 7 and the supporting shaft 2a formed thereon. The lower and upper halves of the housing are connected with each other by screwing the fixing screw 7 from the upper half 2 into a threaded hole made at an end face of the mounting shaft 1b of the lower half 1. The lower half 1 has an integrally formed guide portion 1c arranged coaxially with the supporting shaft 1a thereof. The upper half 2 has the integrally formed guide portion 2c at a place opposite to the guide portion 1c of the lower half 1.

The winding reel body 3 and a winding reel cover 4 are connected with each other to form a winding reel. The bearing 3a formed in the winding reel body 3 and the bearing 4a formed in the winding reel cover 4 are rotatably fitted on respective supporting shafts 1a and 2a. The winding reel body 3 accommodates the driving spring 5 in its center cavity closed with the winding reel cover 4. The driving spring 5 is secured at its internal end to the mounting shaft 1b and at its external end to the winding reel body 3. The measuring strip 6 is secured at its inside end to the winding reel body 3 and is wound on an outer cylindrical surface of the winding reel body 3. A hook 8 is provided at an outside free end of the measuring strip 6 to prevent the free end of the measuring strip from being drawn into the housing (1, 2) and to engage with an object to be measured.

The measuring strip 6 marked off in units for measurement of a length is spirally wound on the outer cylindrical surface of the winding reel body 3. While the measuring strip 6 is drawing out of the housing (1, 2) by a necessary length, the driving helical spring 5 in the winding reel body 3 is stretched and stores returning force in it. After measurement, the measuring strip 6 is automatically rewound by the force of the spring 5.

Figure 4:
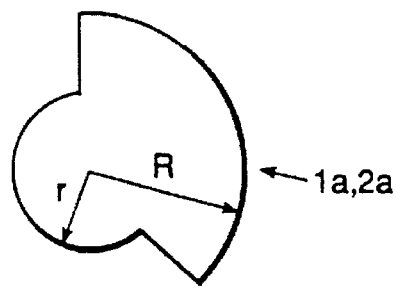
FIG. 4 is a view for explaining a supporting shaft.

In the shown embodiment, the supporting shafts 1a and 2a are made in the form of two coaxial arcs of different radii in each cross section as shown in FIG. 4. There is shown a cross section of each shaft, which is formed by a combination of a small arc portion of smaller radius (r) and a large arc portion of larger radius (R).

In case of drawing the substantially horizontal measuring strip 6 into the housing, the bearings 3a and 4a are supported by large arc portions of the supporting shafts 1a and 2a respectively as shown in FIGS. 1 and 3. The winding reel, therefore, is supported coaxially with the mounting shaft 1a at a low speed of its rotation without entering into contact of the projecting circumferences of the winding reel body 3 and the winding reel cover 4 with the guide portions 1c and 2c, respectively, of the lower half 1 and the upper half 2 of the housing.

When the winding reel rotates faster with an increase of the number of turns of the measuring strip thereon, it starts dancing in the housing because its bearings 3a and 4a are fitted with a play on the supporting shafts 1a and 2a of non-circular section. The winding reel brings side surfaces of its body 3 and cover 4 with inner surfaces of the lower half 1 and the upper half 2 respectively, and the projecting circumferences of its body 3 and cover 4 with the guide portions 1c and 2c, respectively, of the lower half 1 and the upper half g of the housing. The friction force acts on the winding reel to prevent the acceleration of the rotational movement of the winding reel.

It is also possible to form lugs 4b, as shown in FIG. 1, on the side surface of the winding reel cover 4, which may contact with an inside surface of the housing. The lugs may also be formed on the side surface of the winding reel body 3 or on both side surfaces of the winding reel body 3 and cover 4.

When the measuring strip is drawn into the upward directed housing, a winding speed may increase due to the effect of weight of the measuring strip.

Figure 5:
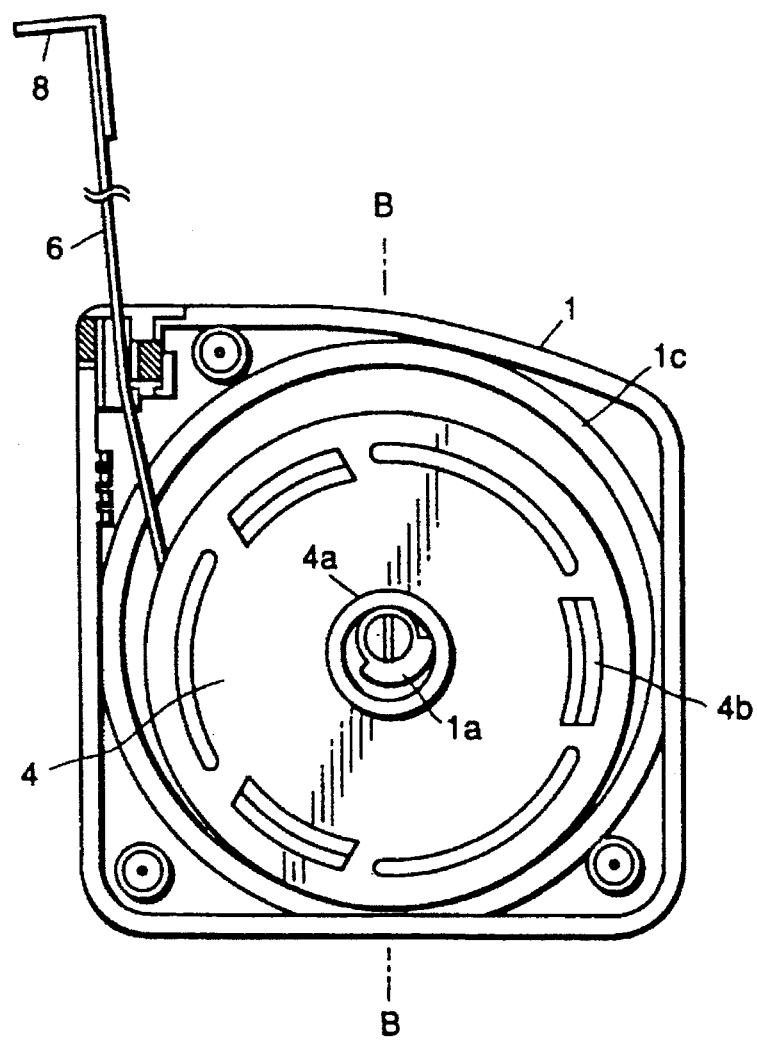
FIG. 5 is a plan view of an embodiment of the tape measure whose housing has an upper half removed for the shake of explanation of its state when winding a measuring strip in downward direction into the housing.
Figure 6:
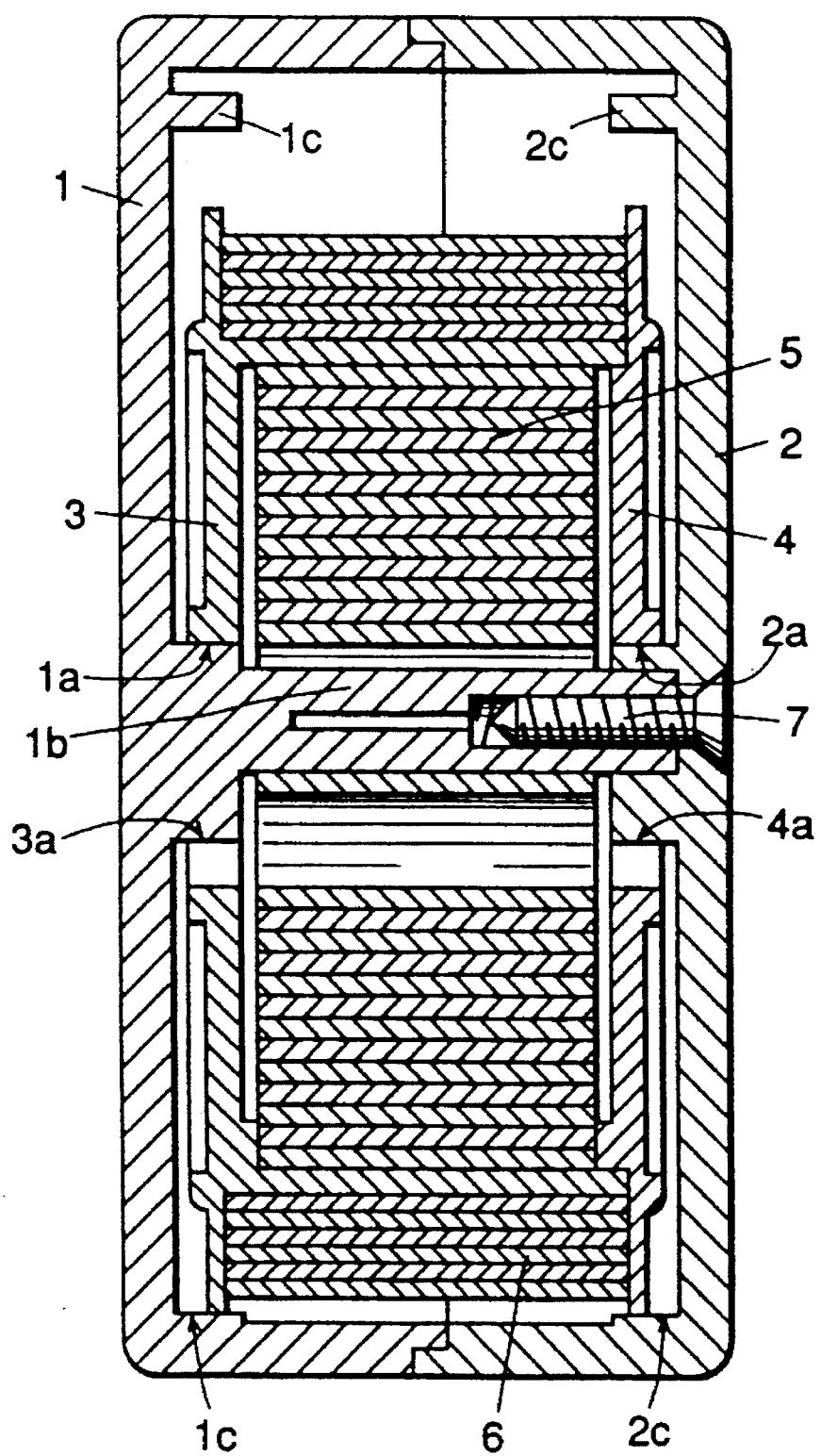
FIG. 6 is a sectional view taken along line B—B of FIG. 5.

FIGS. 5 and 6 are views for explaining how to rewind an upward stretching measuring strip on a winding reel in a housing of a tape measure which is the same as described above with reference to FIGS. 1 to 4. FIG. 5 is a plan view of the tape measure with a removed upper half of the housing and FIG. 6 is a sectional view taken along line B—B of FIG. 5. In FIGS. 5 and 6, the same components as those shown in FIGS. 1 and 3 are given the same reference numbers. In this case, bearings 3a and 4a of a winding reel are supported by small diameter portions of supporting shafts 1a and 2a respectively. The winding reel, therefore, takes a lower position than those shown in FIGS. 1 and 3. Namely, the projecting circumferences of a winding reel body 3 and cover 4 are in contact with guide portions 1c and 2c, respectively, of a lower half 1 and an upper half 2 of a housing. To wind a measuring strip 6, the thus supported winding reel may start rotating with friction and may safely draw the measuring strip into the housing.

Figure 7A:
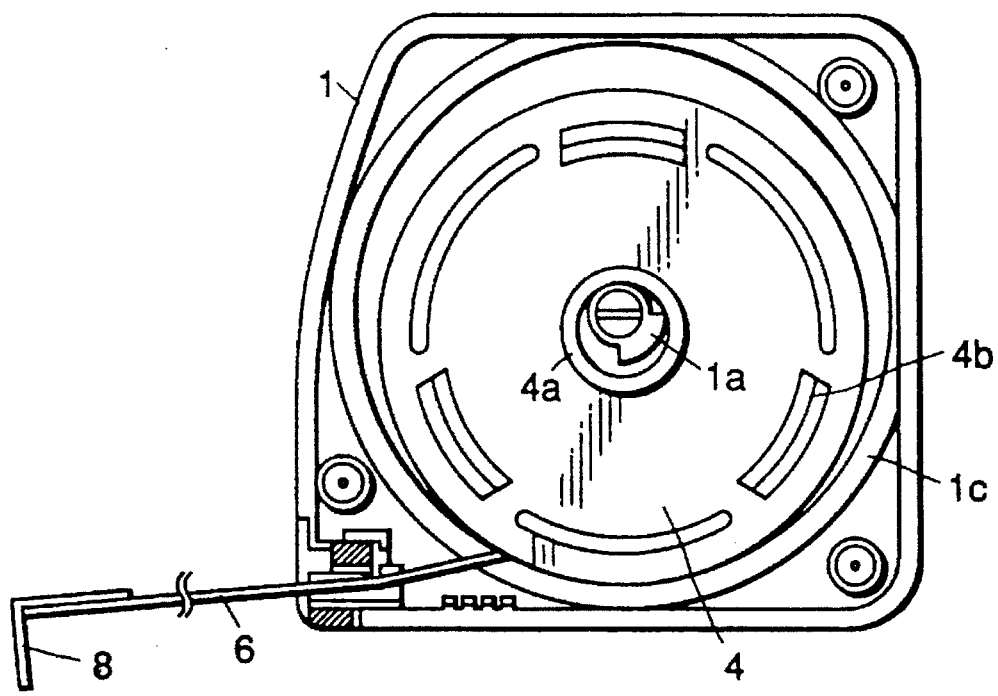
FIGS. 7A and 7B are views for explaining an example of application of another embodiment of a tape measure according to the present invention.
Figure 7B:
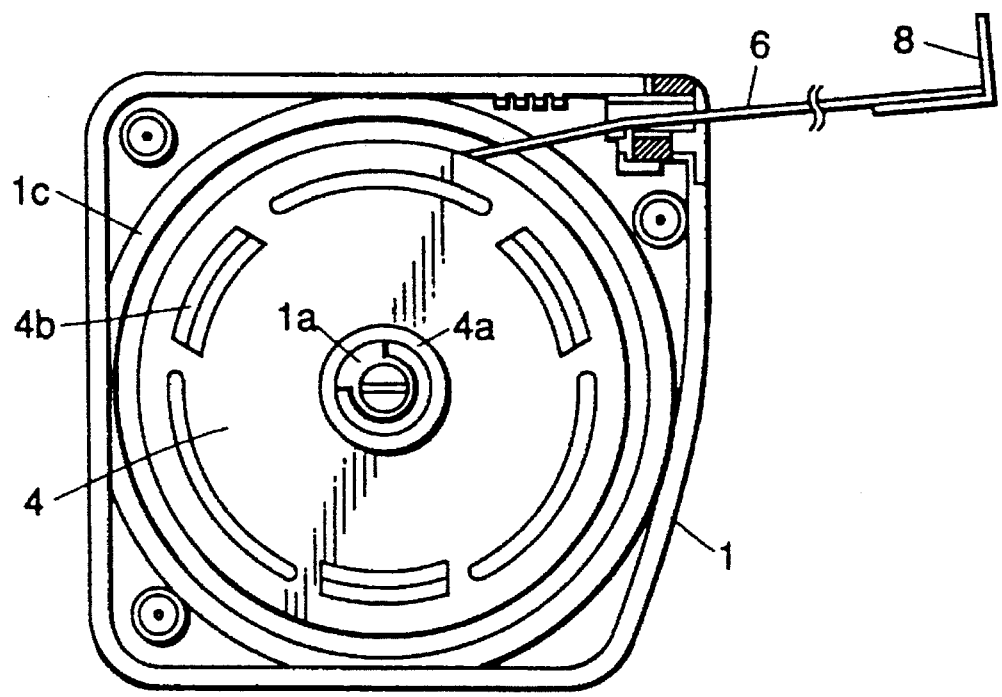
Figure 8A:
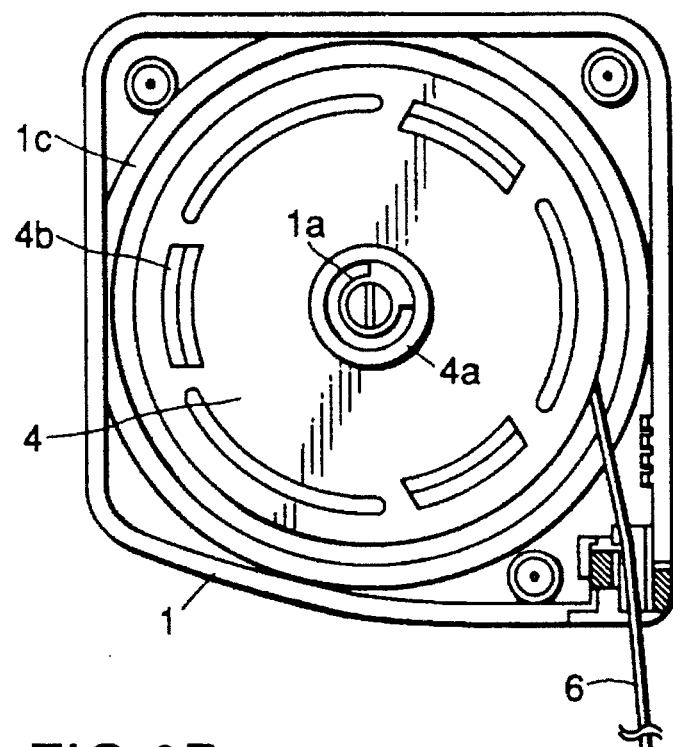
FIGS. 8A and 8B are views for explaining another example of application of a second embodiment of a tape measure according to the present invention.
Figure 8B:
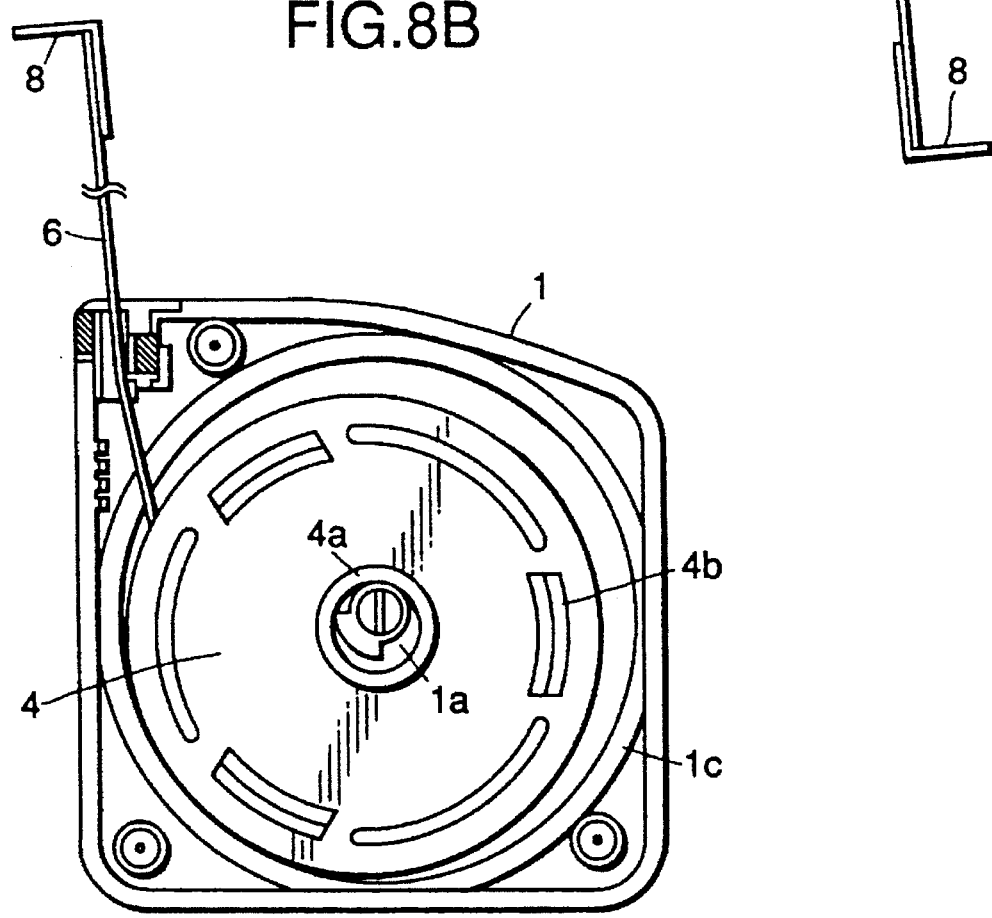
Figure 9A:
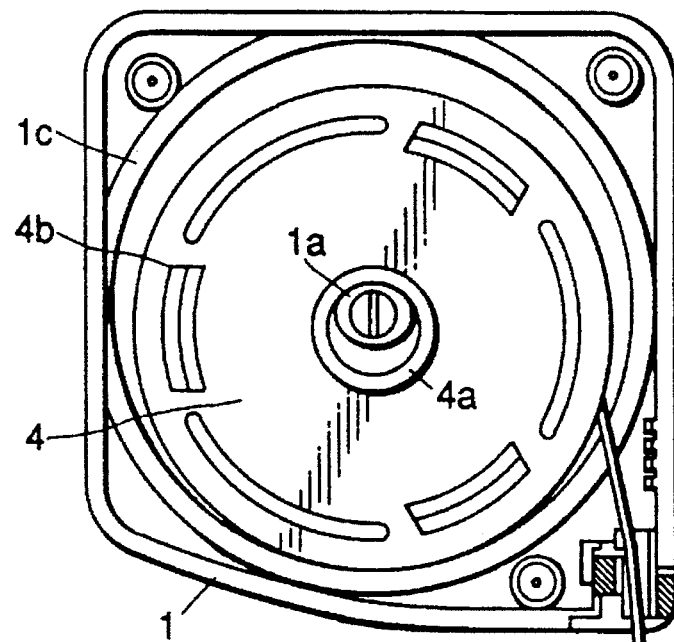
FIGS. 9A and 9B are views for explaining an example of application of a third embodiment of a tape measure according to the present invention.
Figure 9B:
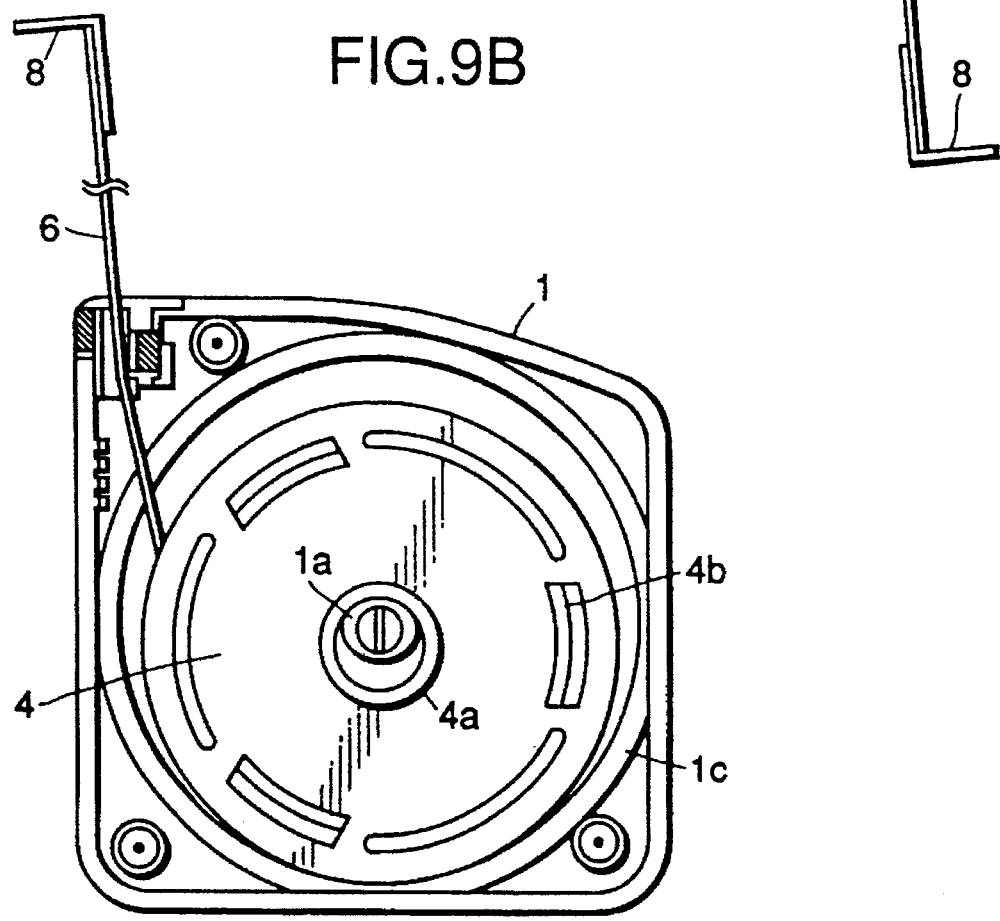
Figure 10A:
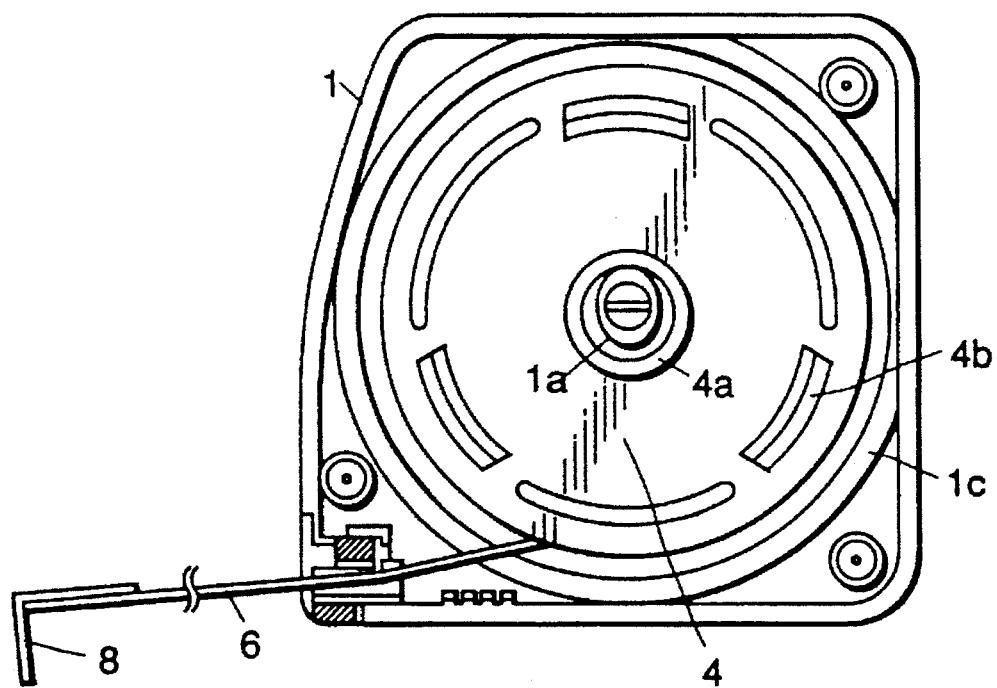
FIGS. 10A and 10B are views for explaining another example of application of a third embodiment of a tape measure according to the present invention.
Figure 10B:
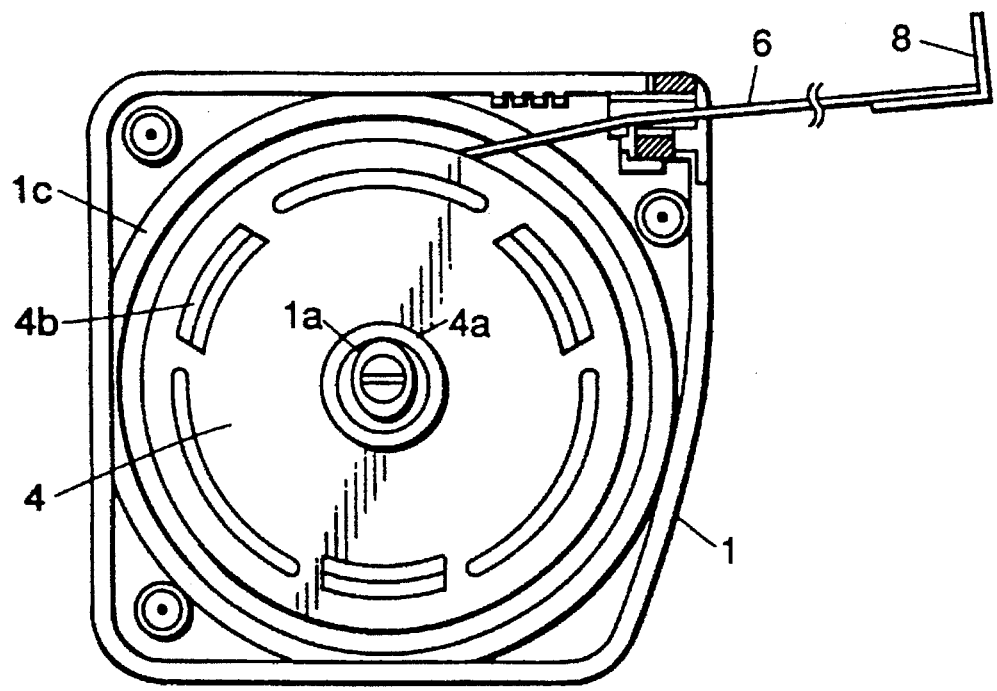

FIGS. 7A, 7B and 8A, 8B are views for explaining a second example of a tape measure embodying the present invention. The components similar to those shown in FIGS. 1 to 6 are given the same reference numbers. In this embodiment, a supporting shaft 1a is similar in its shape to the shaft used in the first embodiment but differs therefrom by its mounting direction as be apparent in comparison of FIG. 7A with FIG. 1. This specified supporting arrangement produces the following effects: In case of drawing a measuring strip 6 into a housing in a lower horizontal direction as shown in FIG. 7A or in a downward direction as shown in FIG. 8B, the projecting circumference of a winding reel cover 4 is in contact with a guide portion 1c and, therefore, the friction force may act on the winding reel as soon as the reel starts its rotational motion and prevent acceleration of the reel rotation, assuring safe winding the measuring strip. In case of drawing a measuring strip 6 into a housing in an upper horizontal direction as shown in FIG. 7B or in an upward direction as shown in FIG. 8A, the projecting circumference of the winding reel cover 4 is not in contact with the guide portion 1c while the winding reel rotates at a low speed. When the winding reel rotates faster, it starts dancing with intermittently bringing the projecting circumference and side lugs 4b of its cover 4 into contact with the guide portion 1c and the inside surface of the housing. The rotation speed of the reel is reduced by friction force acting thereon. Although the winding reel cover is described in the shown embodiment, it must be understood that the side portion (not shown) of the winding reel body can, of course, work similarly.

FIGS. 9A, 9B and 10A, 10B are views for explaining a third example of a tape measure embodying the present invention. The components similar to those shown in FIGS.

1 to 6 are given the same reference numbers. This embodiment uses a supporting shaft 1a which has an oval sectional form and is mounted in an exemplified direction. The operation of the embodiment with the shown supporting shaft is as follows:

In case of drawing a measuring strip 6 downward (FIG. 9A) or upward (FIG. 9B) into a housing, the projecting circumference of a winding reel cover 4 is in contact with a guide portion 1c and, therefore, the friction force may act on the winding reel as soon as the reel starts its rotational movement and it may prevent acceleration of the reel rotation, assuring safe winding the measuring strip. In case of drawing a measuring strip 6 into a housing in an upper (FIG. 10A) or lower (FIG. 10B) horizontal direction, the projecting circumference of a winding reel cover 4 is not in contact with a guide portion 1c while the winding reel rotates at a low speed. When the winding reel rotates faster, it starts dancing, intermittently bringing the circumference and side lugs 4b of its cover 4 into contact with the guide portion 1c and the inside surface of the housing to reduce its rotation speed by friction force produced therebetween. Although the action of the winding reel cover is described in the shown embodiment, it must be understood that the side portion (not shown) of the winding reel body can, of course, work similarly.

It must be also understood that the sectional form of the supporting shaft is not limited to those of the shafts used in the above-mentioned embodiments but may be of any other suitable non-circular form. It is also possible to use a shaft being circular in section and having a diameter smaller than that of a bearing bore of the winding reel. For example, the supporting shaft having a circular section having a radius corresponding to the smaller radius of the shaft shown in FIG. 4 may be used. Even in this case, it is possible to cause a frictional braking force acting on the winding reel to vary depending upon the working direction of the housing by devising arrangement of the supporting shaft and position and form of the guide portion.

As is apparent from the foregoing, a tape measure according to the present invention is capable of producing a braking force adapted to working direction of its housing by virtue of an unique design that a supporting shaft is fitted with a play in a larger bearing bore of a winding reel to allow the winding reel to bring its projecting circumferences (rims) into contact or get out of contact with a guiding portion of the housing when winding a measuring strip.

Figure 11:
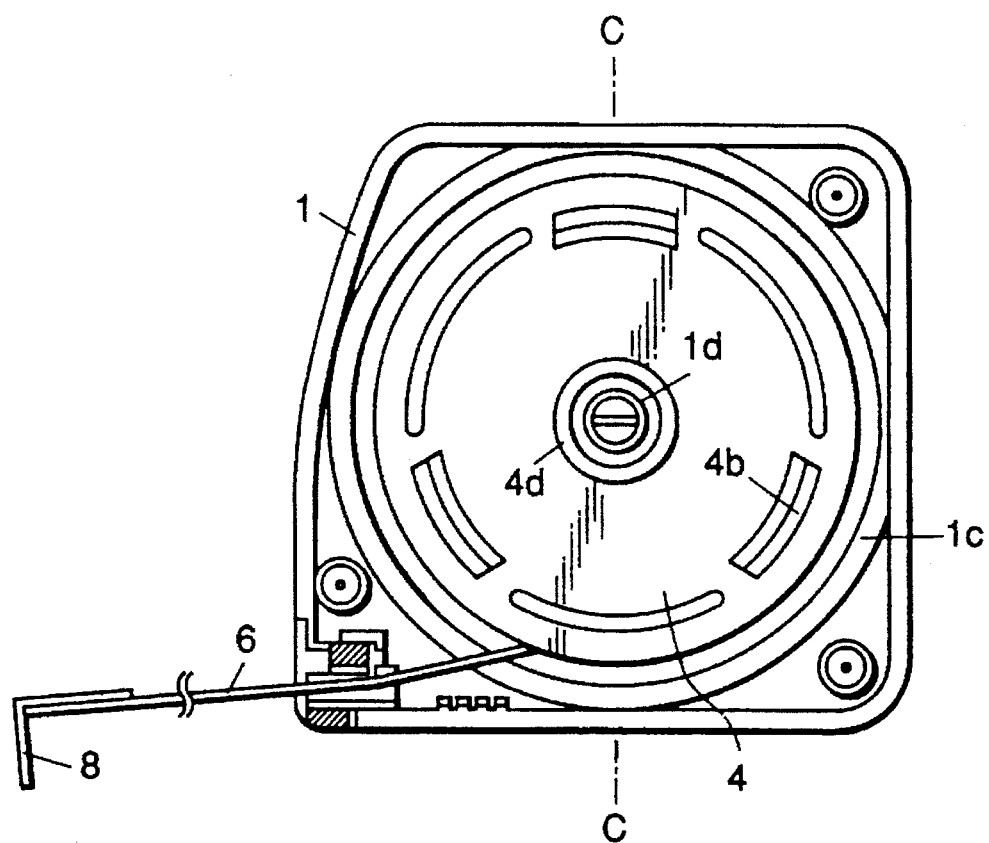
FIG. 11 is a plan view of an example of tape measure, with a removed upper half of its housing, which uses a long measure winding device embodying the present invention.
Figure 12:
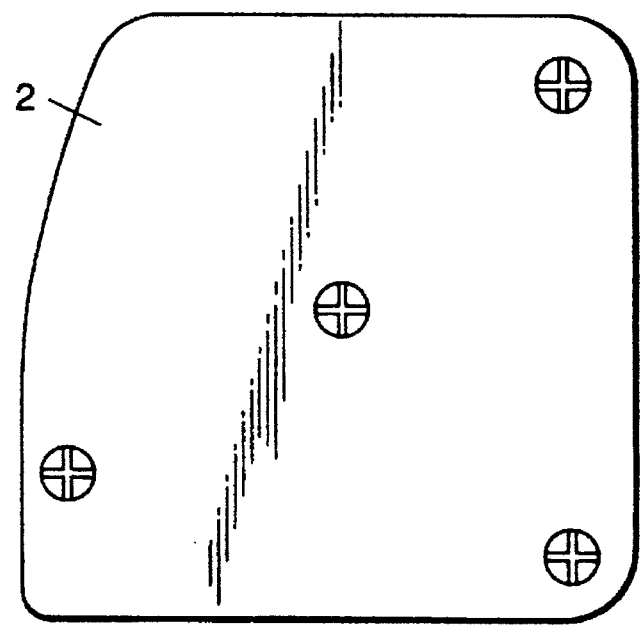
FIG. 12 is a plan view of the upper half of the housing of FIG. 11.
Figure 13:
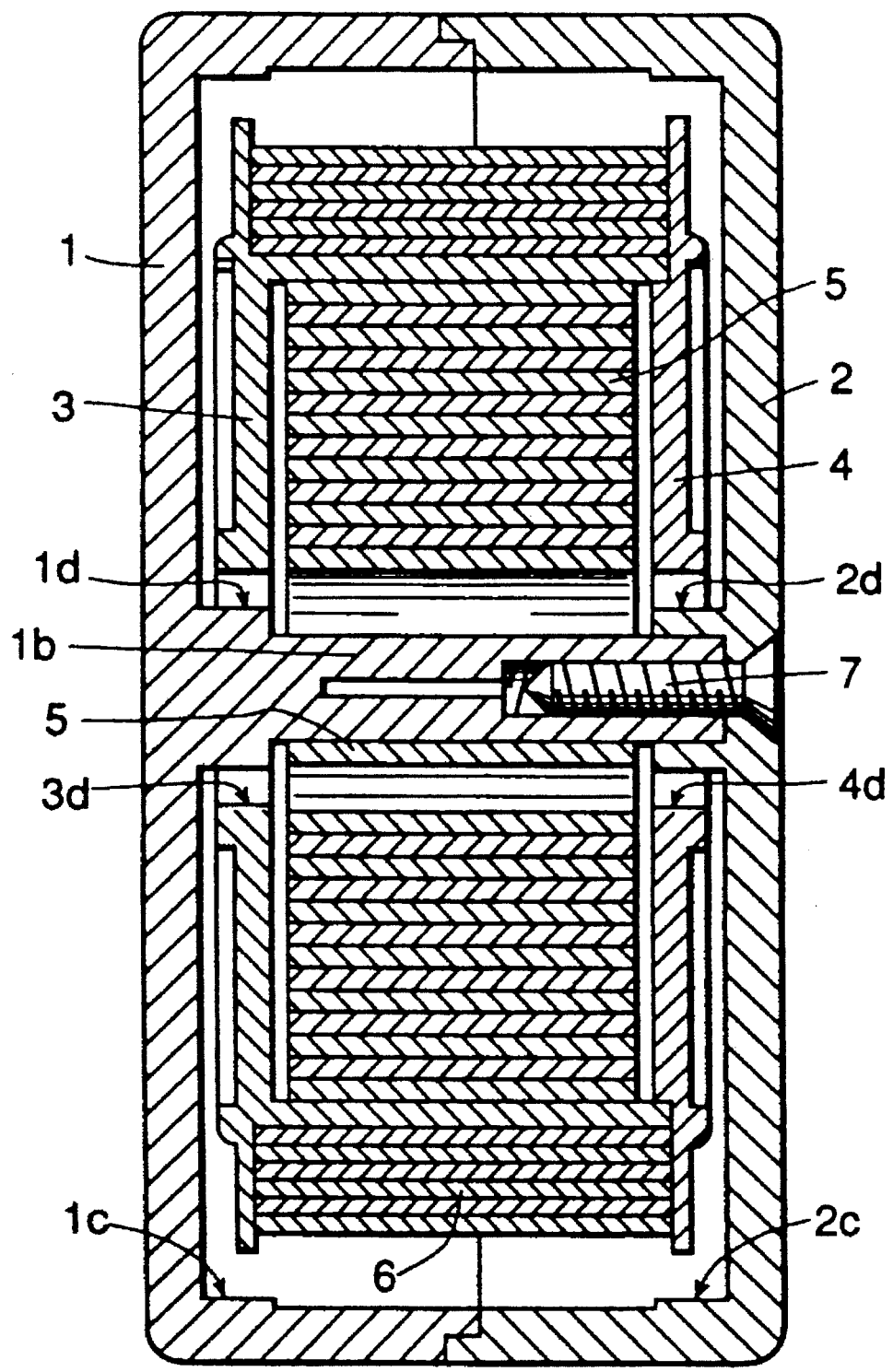
FIG. 13 is a sectional view taken on line C—C in FIG. 11.

FIGS. 11 to 13 are views for explaining further embodiment of a tape measure according to the present invention: FIG. 11 is a plan view of the tape measure with a removed upper half of its housing, FIG. 12 shows the removed upper half of the housing and FIG. 13 is a view taken on line C—C of FIG. 11. In FIGS. 11 to 13, numeral 1 designates a lower half of a housing, 2 an upper half of the housing, 1d, 2d supporting shafts, 1b a mounting shaft, 1c, 2c guide portions, 3 a winding Feel body, 4 a winding reel cover, 3d, 3d bearings, 4b a lug, 5 a driving spring, 6 a measuring strip, 7 a fixing screw and 8 an end hook.

The housing consists of the lower half 1 and the upper half 2. Two halves are fitted-on each other at their stepped peripheral edges. The lower half 1 of the housing is provided at its center portion with the mounting shaft lb whose base is formed integrally with the supporting shaft 1d. The upper half 2 of the housing has, in its center portion, a hole for the fixing screw 7 and the supporting shaft 2d formed thereon. The lower and upper halves of the housing are connected with each other by screwing the fixing screw 7 from the upper half 2 into a threaded hole made at an end face of the mounting shaft 1b of the lower half 1. The lower half 1 has an integrally formed guide portion 1c arranged coaxially with the supporting shaft 1d thereof. The upper half 2 has the integrally formed guide portion 2c at a place opposite to the guide portion 1c of the lower half 1.

The winding reel body 3 and a winding reel cover 4 are connected with each other to form a winding reel. The bearing 3d formed in the winding reel body 3 and the bearing 4d formed in the winding reel cover 4 are rotatably fitted on respective supporting shafts 1d and 2d. The winding reel body 3 accommodates the driving spring 5 in its center cavity closed with the winding reel cover 4. The driving spring 5 is secured at its internal end to the mounting shaft 1b and at its external end to the winding reel body 3. The measuring strip 6 is secured at its inside end to the winding reel body 3 and is wound on an outer cylindrical surface of the winding reel body 3. A hook 8 is provided at an outside free end of the measuring strip 6 to prevent the free end of the measuring strip from being drawn into the housing (1, 2) and to engage with an object to be measured.

The measuring strip 6 marked off in units for measurement of a length is spirally wound on the outer cylindrical surface of the winding reel body 3. While housing (1, 2) by a necessary length, the driving helical spring 5 in the winding reel body 3 is stretched and stores returning force in it. After measurement, the measuring strip 6 is automatically rewound by the force of the spring 5.

In the shown embodiment, the supporting shafts 1d and 2d have a diameter smaller than an inner diameter of the bearings 3d and 4d respectively. Therefore, when the winding reel is placed coaxially with a center axis, there is formed a ring clearance around the supporting shafts 1d and 2d in the bearings 3d and 4d.

Figure 14:
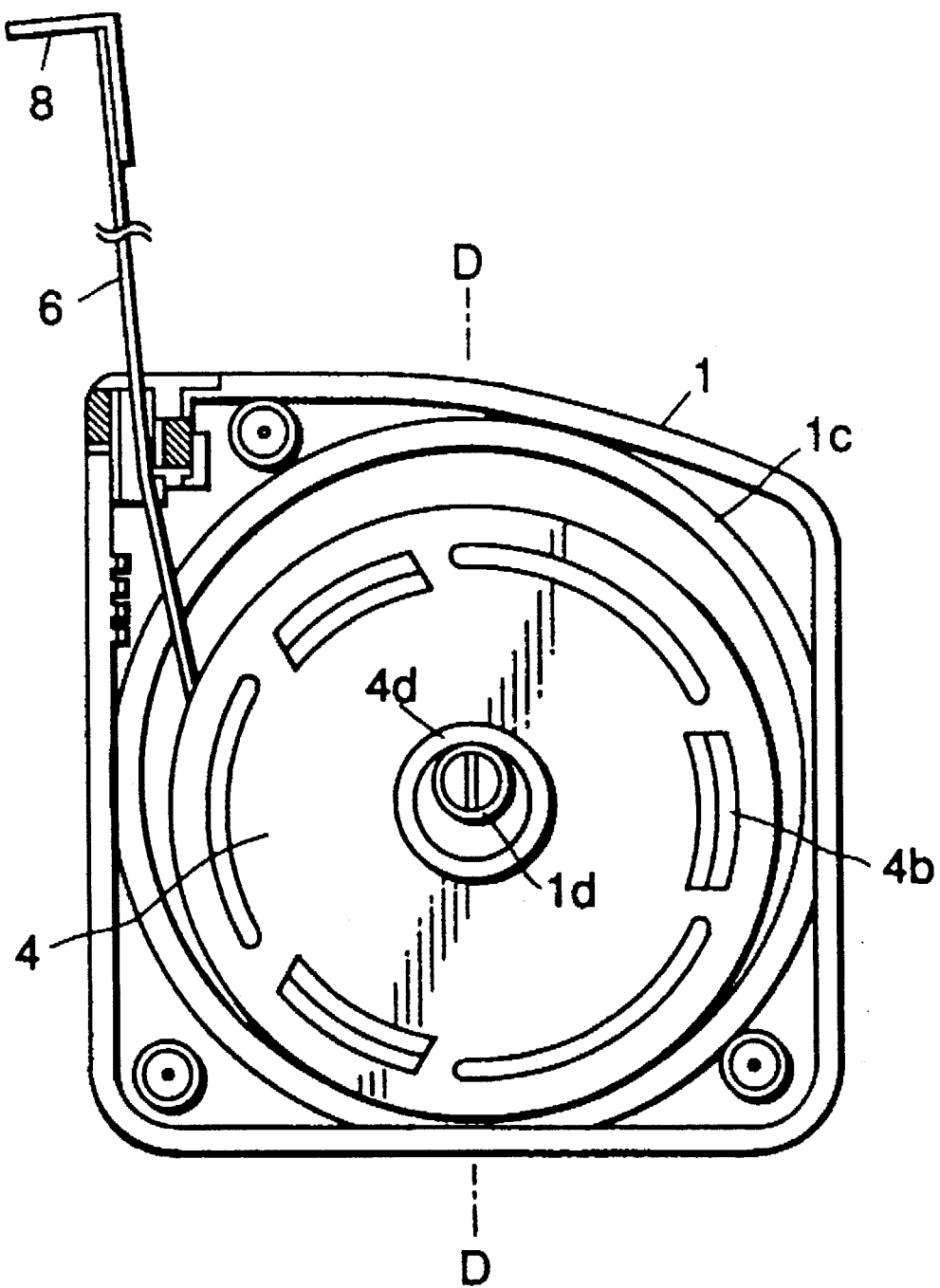
FIG. 14 is a view showing the tape measure of FIG. 11 when winding an upward stretched measuring strip.
Figure 15:
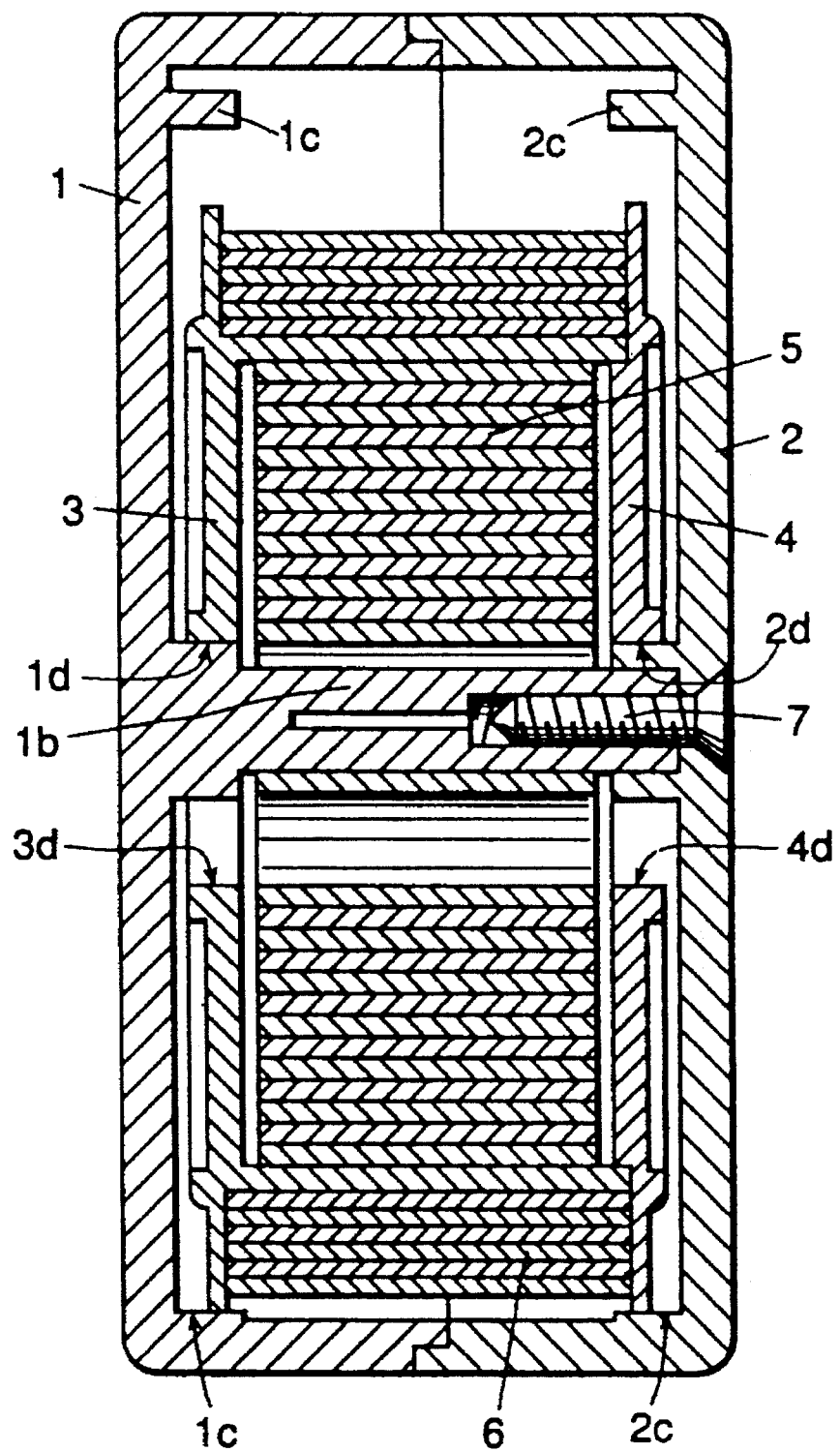
FIG. 15 is a sectional view taken on line D—D in FIG. 14.

FIGS. 14 and 15 are views for explaining how to wind a vertically stretched measuring strip on a winding reel in a housing of the tape measure: FIG. 14 is a plan view of the tape measure with an upper half-housing removed and FIG. 15 is a sectional view taken along line D—D of FIG. 14. In FIGS. 14 and 15, the same components as those shown in FIGS. 11 and 13 are given the same reference numbers. In the sown case, bearings 3d and 4d by the action of the weight of a winding reel lie on supporting shafts 1d and 2d respectively. The winding reel, therefore, takes a lower position than those shown in FIGS. 11 and 13. Namely, the projecting circumferences of the winding reel body 3 and cover 4 are in contact with guide portions 1c and 2c, respectively, of a lower half 1 and an upper half 2 of a housing. In this case, the winding reel may rotate all along with a friction force acting thereon and, therefore, may safely draw the measuring strip into the housing. There is no fear of seizing the winding reel on the guiding portions 1c and 2c even if dirt entered therebetween since the winding reel may dance in and along the clearance between the supporting shafts and the bearings.

The rotation speed of the winding reel can be limited by friction of its rims with guide portions of the housing. However, when the winding reel rotates faster for some reason or other with an increase of windings of the measuring strips thereon, the winding reel starts dancing in and along the clearance between the bearings 3d, 4d and the supporting shafts 1d, 2d and, at the same time, the side surfaces of its body 3 and cover 4 intermittently come into contact with the inside wall of the lower and upper halves 1 and 2 of the housing, keeping contact between its projecting circumferences and the guide portions 1c, 2c of the lower half 1 and the upper half 2 of the housing. This produces a larger braking force acting on the winding reel to reduce its rotation speed.

It is also possible to form lugs 4b, as shown in FIG. 11, on the side surface of the winding reel cover 4, which may contact with an inside surface of the housing. The lugs may also be formed on the side surface of the winding reel body 3 or on both side surfaces of the winding reel body 3 and cover 4.

Figure 16:
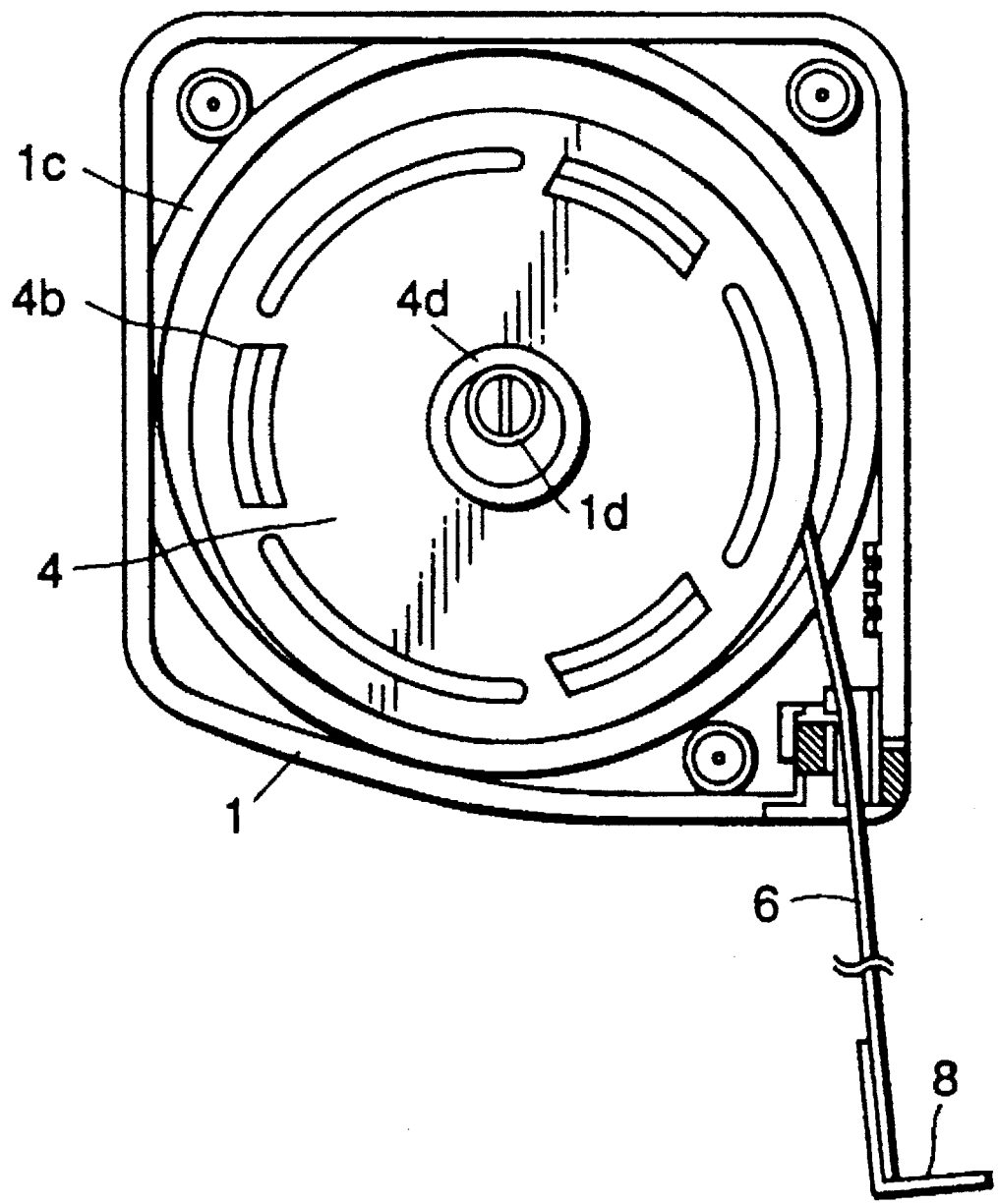
FIG. 16 is a view showing the tape measure of FIG. 11 when winding a downward stretched measuring strip.
Figure 17:
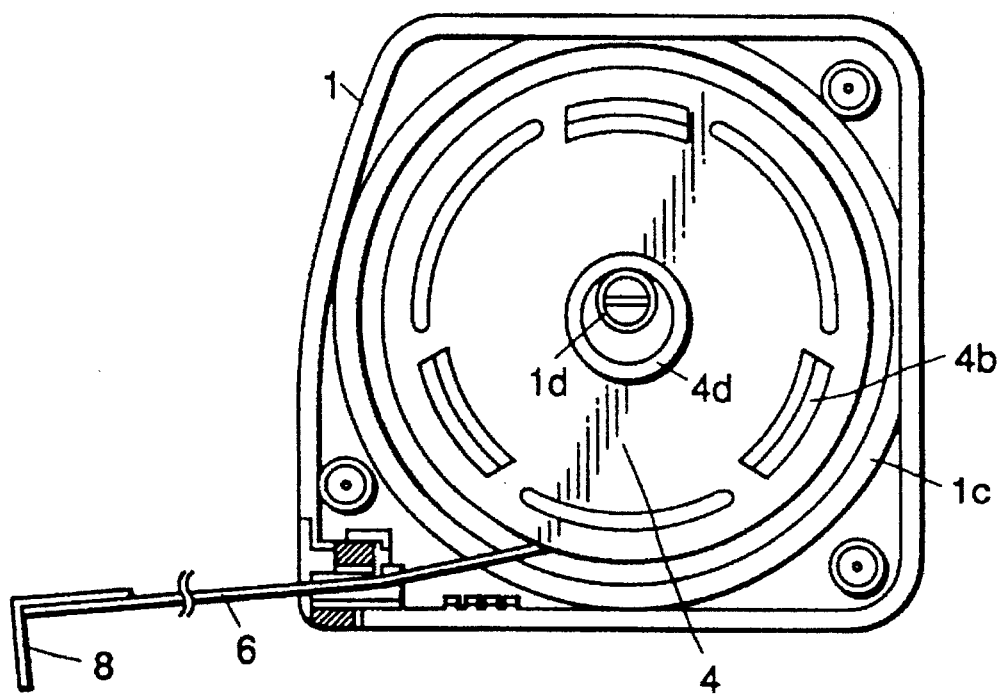
FIG. 17 is a view showing the tape measure of FIG. 11 when winding a horizontally stretched measuring strip.
Figure 18:
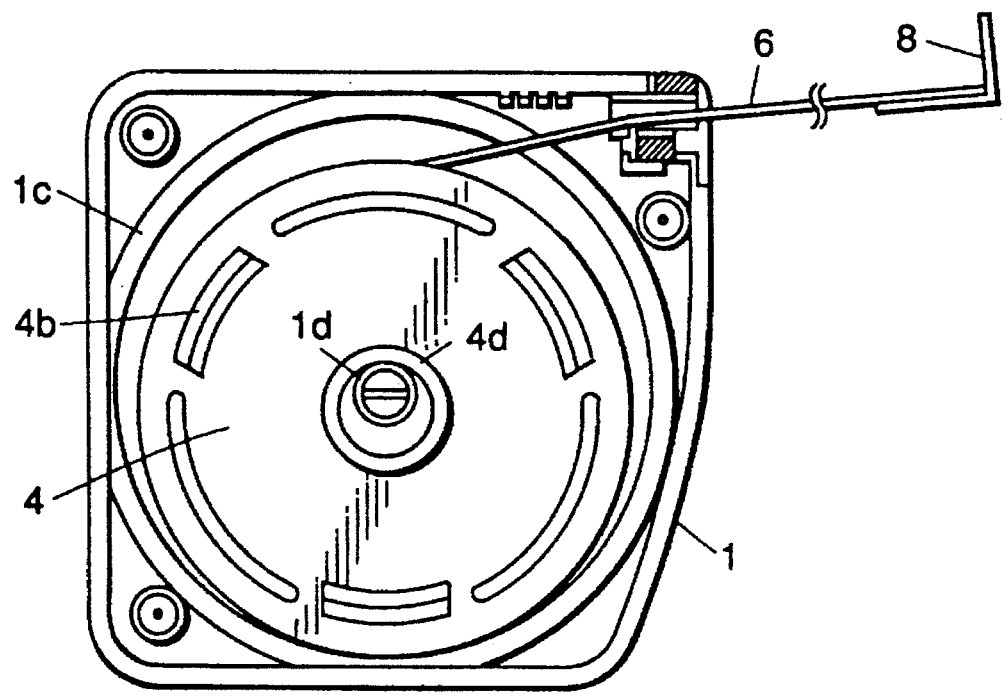
FIG. 18 is another view showing the tape measure when winding a downward stretched measuring strip.

FIG. 16 is a view for explaining the operation of a tape measure in case of drawing a measuring strip upward into the housing. FIGS. 17 and 18 show a tape measure in case of drawing a measuring strip horizontally into the housing. In every case, the winding reel by the action of its weight lies on the supporting shaft and takes a lower position than the cases shown in FIGS. 11 and 13. Consequently, the projecting circumferences of the winding reel body 3 and cover 4 are in contact with guide portions 1c and 2c, respectively, of a housing. In this case, the winding reel may rotate with a friction force acting thereon, keeping a constant speed of its rotation. If the winding reel rotates faster for some reason or other, the winding reel starts dancing in and along to the clearance between the bearings 3d, 4d and the supporting shafts 1d, 2d and, at the same time, the projecting circumferences and the side surfaces of its body 3 and cover 4 come into contact with the guide portions 1c, 2c and the inside wall, respectively, of the lower half 1 and the upper half 2 of the housing. This produces a larger braking force acting on the winding reel which can reduce its rotation speed. The above-mentioned motions are the same as those described cases of FIGS. 14 and 15.

I claim:

1. A tape measure comprising a housing, a support shaft in said housing, a winding reel having a winding spring and a measuring strip, said winding reel having a bearing bore, said support shaft being disposed in said bearing bore, said shaft having a first cross-sectional area, said bearing bore having a second cross-sectional area which is greater than said first cross-sectional area to thereby provide a clearance space between said shaft and said bearing bore which enables said bearing bore to freely move eccentrically relative to said shaft due to the weight of the winding reel and the rotation of said winding reel on said shaft, whereby during winding of the measuring strip by the force of said spring, said winding reel is freely moveable eccentrically in said housing, said winding reel having an outer engaging surface, said housing having an inner engaging surface, said eccentric movement of said winding reel in said housing effecting contact between said outer engaging surface of said winding reel and said inner engaging surface of said housing to thereby provide a braking action during winding of said winding strip onto said winding reel in said housing.

2. A tape measure according to claim 1 wherein said first and second parts are joined to one another by radial extending surfaces.

3. A tape measure according to claim 1 wherein one of said two parts is a circular section having a diameter substantially equal to the diameter of the circularly configured bearing bore.

4. A tape measure according to claim 3 wherein the other of said two parts is a circular section having a diameter less than the diameter of the circularly configured bearing bore.

5. A tape measure according to claim 3 wherein the circular section of said first part subtends a circular arc which is less than the circular arc subtended by said circular section of said second part.

6. A tape measure according to claim 1 wherein said two parts are juxtaposed to one another such that during one portion of one revolution of said winding reel, said first part engages said bearing bore to position said winding reel at a first location in said housing and during another portion of said one revolution of said winding reel, said second part engages said bearing bore to position said winding reel at a second location in said housing, said second location being displaced from said first location.

7. A tape measure according to claim 6 wherein the amount of displacement between said first location and said second locations is substantially equal to the difference between the radius of said two parts.

8. A tape measure comprising a housing, a support shaft in said housing, a winding reel having a winding spring and a measuring strip, said winding reel having a central bearing bore, said support shaft being disposed in said bearing bore, said shaft having a first cross-sectional area, said bearing bore having a second cross-sectional area which is greater than said first cross-sectional area such that said bearing bore is freely moveable up and down relative to said shaft due to the weight of the winding reel and the rotation of said winding reel on said shaft, whereby during winding of the measuring strip by the force of said spring, said winding reel is freely moveable up and down in said housing, said winding reel having an outer peripheral portion, said housing having an inner peripheral portion, said up and down movement of said winding reel in said housing resulting in contact between said outer peripheral portion of said winding reel and said inner peripheral portion of said housing to thereby provide a braking action during winding of said winding strip onto said winding reel in said housing.

9. A tape measure comprising a housing, a support shaft in said housing, said shaft having a cross-sectional configuration which has two parts with each part having a different diameter, a winding reel having a winding spring and a measuring strip, said winding reel having a bearing bore, said bearing bore having a circular cross-sectional configuration, said support shaft being disposed in said bearing bore, said shaft having a first cross-sectional area, which is greater than said first cross-sectional area to thereby provide a clearance space between said shaft and said bearing bore which enables said bearing bore to freely move eccentrically relative to said shaft due to the weight of the winding reel and the rotation of said winding reel on said shaft, whereby during winding of the measuring strip by the force of said spring, said winding reel is freely moveable eccentrically in said housing, said winding reel having an outer engaging surface, said housing having an inner engaging surface, said eccentric movement of said winding reel in said housing effecting contact between said outer engaging surface of said winding reel and said inner engaging surface of said housing to thereby provide a braking action during winding of said winding strip onto said winding reel in said housing.

10. A tape measure comprising a housing, a support shaft in said housing, said shaft having a generally elliptical cross-sectional configuration, a winding reel having a winding spring and a measuring strip, said winding reel having a bearing bore, said bearing bore having a circular cross-sectional configuration, said support shaft being disposed in said bearing bore, said shaft having a first cross-sectional area, said bearing bore having a second cross-sectional area which is greater than said first cross-sectional area to thereby provide a clearance space between said shaft and said bearing bore which enables said bearing bore to freely move eccentrically relative to said shaft due to the weight of the winding reel and the rotation of said winding reel on said shaft, whereby during winding of the measuring strip by the force of said spring, said winding reel is freely moveable eccentrically in said housing, said winding reel having an outer engaging surface, said housing having an inner engaging surface, said eccentric movement of said winding reel in said housing effecting contact between said outer engaging surface of said winding reel and said inner engaging surface of said housing to thereby provide a braking action during winding of said winding strip onto said winding reel in said housing.

11. A tape measure according to claim 10 wherein said elliptically configured shaft has a major axis and a minor axis in which the major axis is greater than the minor axis.

12. A tape measure according to claim 11 wherein the length of said minor axis is less than the diameter of the circularly configured bearing bore.

13. A tape measure according to claim 11 wherein the length of said major axis is less than the diameter of the circularly configured bearing bore.

14. A tape measure according to claim 10 wherein said elliptically configured shaft has one arcuate portion disposed at the ends of said major axis and another arcuate portion disposed at the ends of said minor axis, said one and said other arcuate portions being disposed such that during one part of one revolution of said winding reel, said one arcuate portion engages said bearing bore to position said winding reel at a first location in said housing and during another part of said one revolution of said winding reel, said other arcuate portion engages said bearing bore to position said winding reel at a second location in said housing, said second location being displaced from said first location.

15. A tape measure according to claim 14 wherein the amount of displacement between said first location and said second location is substantially equal to one-half the difference between the length of said major axis and said minor axis.

16. A tape measure comprising a housing, a support shaft in said housing, a winding reel having a winding spring and a measuring strip, said winding reel having a bearing bore, said bearing bore having a circular cross-sectional configuration, said support shaft being disposed in said bearing bore, said shaft having one circular part circumferentially spaced from another circular part such that during one portion of one revolution of said winding reel, said one circular part engages said bearing bore to position said winding reel at a first location in said housing and during another portion of said one revolution of said winding reel said other circular part engages said bearing bore to position said winding reel at a second location in said housing, said second location being displaced from said first location, said one circular part having a diameter less than the diameter of said bearing bore to thereby provide a clearance space between said one circular part and said bearing bore which enables said bearing bore to freely move eccentrically relative to said shaft due to the weight of the winding reel and the rotation of said winding reel on said shaft, whereby during winding of the measuring strip by the force of said spring, said winding reel is freely moveable eccentrically in said housing, said winding reel having an outer engaging surface, said housing having an inner engaging surface, said eccentric movement of said winding reel in said housing effecting contact between said outer engaging surface of said winding reel and said inner engaging surface of said housing to thereby provide a braking action during winding of said winding strip onto said winding reel in said housing.

17. A tape measure according to claim 16 wherein the amount of displacement between said first location and said second location is substantially equal to the difference between the radius of said circularly configured shaft and the radius of said circularly configured bearing bore.

\* \* \* \* \*

UNITED STATES PATENT AND TRADEMARK OFFICE
CERTIFICATE OF CORRECTION

PATENT NO. : 5,624,085
DATED : April 29, 1997
INVENTOR(S) : Tsutomu USAMI It is certified that error appears in the above-identified patent and that said Letters Patent is hereby corrected as shown below:

Claim 2, line 1, change "1" to --9--.

Claim 3, line 1, change "1" to --9--.

Claim 6, line 1, change "1" to --9--.

Signed and Sealed this

Eleventh Day of April, 2000

*Attest:*

Q. TODD DICKINSON

*Attesting Officer*   *Director of Patents and Trademarks*